June 24, 1969    G. PETRO, JR    3,451,575
CONVEYOR BUCKET WITH HYDRAULICALLY OPERATED GRILLE-LIKE LID
Filed Sept. 15, 1967

INVENTOR.
GEZA PETRO JR.
BY
ATT'Y

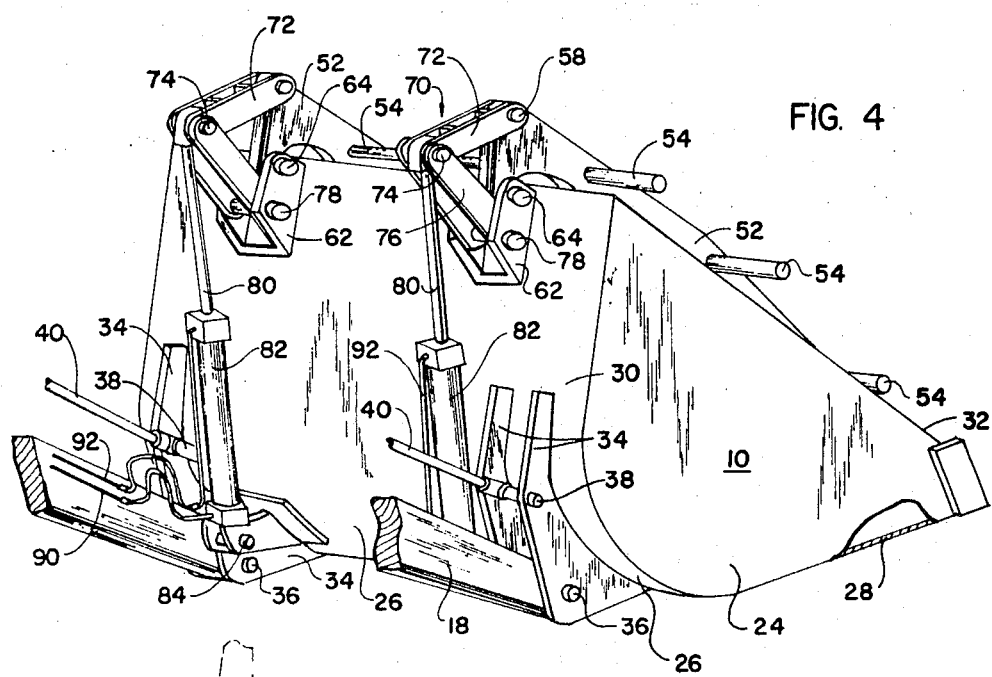
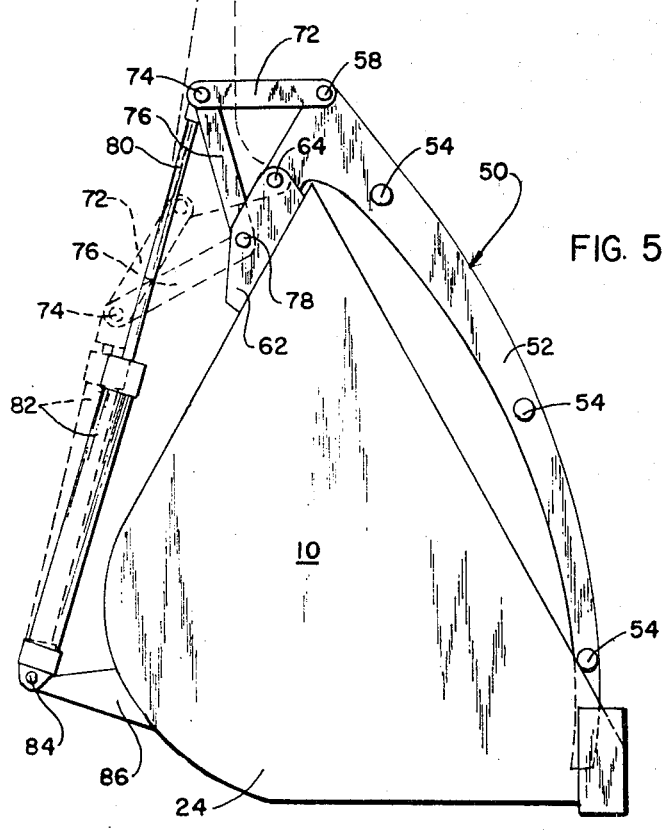

United States Patent Office 3,451,575
Patented June 24, 1969

3,451,575
CONVEYOR BUCKET WITH HYDRAULICALLY-
OPERATED GRILLE-LIKE LID
Geza Petro, Jr., Danville, Ill., assignor of one-third each to Tiberio Monoki, and F. Daniel Welsch, Danville, Ill.
Filed Sept. 15, 1967, Ser. No. 668,227
Int. Cl. E02f 3/00; B66c 3/00
U.S. Cl. 214—767                    2 Claims

ABSTRACT OF THE DISCLOSURE

A conveyor bucket adapted to be hingedly connected to the distal end of a tractor boom and having a hinged grille-like lid which is movable between open and closed positions over the open upper rim of the bucket. In its open position, the lid is disposed in an entirely out-of-the-way position so that it does not interfere with the normal scooping action of the bucket and it also extends substantially vertically from the rear end wall of the bucket so that it acts as a back stop to restrain material from being by-passed over the bucket, thereby insuring a full bucket load during the scooping operation. The lid constitutes a closure to retain material within the confines of the bucket when the latter is not overfilled, but when the bucket is overfilled, the lid functions to clamp the excess material in position on the bucket, thereby increasing bucket capacity.

---

The improved conveyor bucket comprising the present invention is designed for use primarily in connection with a bucket-equipped tractor or endloader of the type which is commonly employed for clearing brush, picking up trash, loading loose lumber, brick and debris at the scene of a wrecking installation, or otherwise gathering and loading loose material regardless of its nature. The principles of the invention are, however, applicable to other power-actuated equipment which employs a bucket or a shovel of the type which is capable of picking up loose material by a scooping action and then dumping such material at a remote location. The conveyor bucket of the present invention may, therefore, with or without modification as required, be applied to a wide variety of power-actuated equipment regardless of its nature or the specific use to which it may be put, the only essential being that such equipment be provided with suitable controls for raising and lowering the bucket and for tilting the same between its normal upright scooping position and its substantially inverted dumping position.

In the normal use of power-actuated conveyor equipment of the type under consideration and in which a conveyor bucket is employed for picking up and dumping loose granular material such as dirt, clay, sand or the like, an open-rimmed bucket may readily be manipulated so that it will pick up and convey not only a full load, i.e., one equal to its volumetric capacity, but it may be caused to contain an excess or heaping load. However, when the bucket of the equipment is employed for picking up indiscriminate loose material such as brush, lumber, bricks and mixed materials such as may be found at the scene of a wrecking installation, it has been found expedient to equip the bucket with a lid which is in the form of a grille and may be caused to move into and out of position over the open rim of the bucket in order not only to retain the gathered material within the bucket, but also to exert a clamping action on the material so that certain objects which do not readily fit within the bucket and otherwise would not be captured thereby may be held within the bucket by a sort of clamping jaw action, thus materially increasing the capacity of the bucket for a given load. For example, a piece of lumber which ordinarily would attain a degree of unstable equilibrium within the bucket may, by the provision of the grille-like lid of the present invention, be held securely to the bucket even though only a small portion thereof extends into the bucket interior and may thus be carried by the bucket to a point of discharge.

The present invention is concerned with a novel form of grille-like retaining lid for a conveyor bucket, a novel mounting means for the lid, and novel hydraulic means for moving the lid between its open and closed positions over the bucket rim.

It is a general object of the invention to provide a conveyor bucket wherein the hinged or pivoted lid, when in its open condition, assumes an out-of-the-way position wherein it will not interfere with the normal scooping action of the bucket under the control of whatever conventional or other bucket-elevating and tilting means may be employed for normal bucket operation.

A further object of the invention is to provide a conveyor bucket wherein the lid therefor may be selectively move dbetween its open and its closed positions at any time regardless of the particular elevation or inclination of the bucket, the control means for the lid in no way interfering with the usual normal bucket movements.

The provision of a conveyor bucket lid which is of extremely simple design and, therefore, may be manufactured at a low cost; one which is rugged and durable and, therefore, will withstand rough usage; one which is comprised of a minimum number of moving parts and, therefore, is unlikely to get out of order; one which may be manufactured as original equipment or, alternatively, may be applied to an existing conveyor bucket; one which is capable of ease of assembly and dismantlement for purposes of inspection of parts, replacement or repair thereof; and one which otherwise is well-adapted to perform the services required of it, are further desirable features which have been borne in mind in the production and development of the present invention.

Other objects and the various advantages and characteristics of the present invention, not at this time enumerated, will readily suggest themselves as the nature of the invention is better understood from a consideration of the following detailed description.

In the accompanying two sheets of drawings forming a part of this specification, one illustrative embodiment of the invention is shown.

In these drawings:

FIG. 4 is an enlarged fragmentary rear perspective view of the conveyor bucket, the grille-like lid therefor being shown in its closed position over the bucket rim; and FIG. 5 is a side elevational view of the structure shown in FIG. 4.

Figure 1:
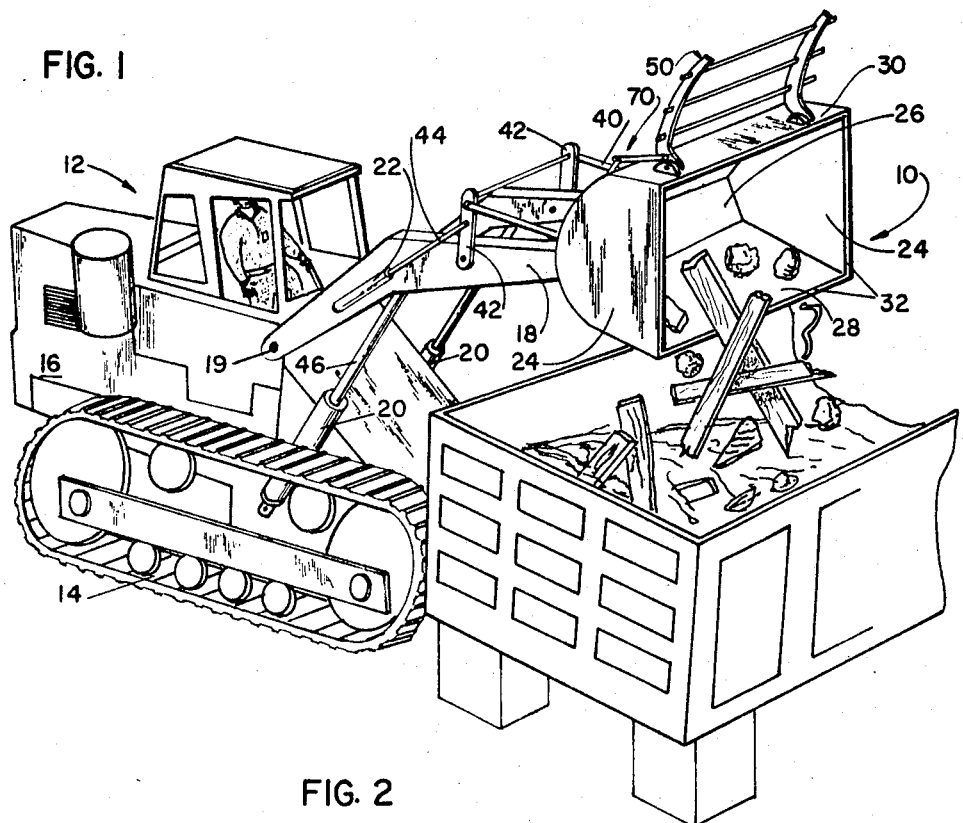
FIG. 1 is a perspective view, somewhat schematic in its representation, showing the improved bucket of the present invention operatively applied to a typical endloader type of conveyor.

Referring now to the drawings in detail and in particular to FIG. 1, a conveyor bucket embodying the principles of the present invention is designated in its entirety by the reference numeral 10 and is shown as being operatively installed upon a conventional, tractor-type, conveyor vehicle 12, the details of which form no part of the present invention. Such vehicle, in the exemplary form which has been selected for illustration herein, employs caterpillar-type treads 14 for tractionally supporting the vehicle body 16. Two boom arms 18 are pivotally connected at 19 to the body 16, project forwardly of the latter, and serve at their distal or forward ends operatively to support the bucket 10. Raising and lowering of the arms 18, and consequent or resultant raising of the bucket 10 is effected under the control of a pair of hydraulic cylinders 20, while tilting of the bucket in the usual manner of bucket movement is effected under the control of an additional pair of hydraulic cylinders 22 in a manner that will be made clear presently.

Referring now additionally to FIG. 4 of the drawings, the bucket 10 per se is of conventional configuration and consists of a trough-like receptacle having parallel, spaced apart side walls 24, a curved bottom wall 26, and outwardly diverging front and rear walls 28 and 30 which merge gradually with the curved bottom wall 26, the receptacle presenting an open upper rim 32. Welded or otherwise secured to the outer surfaces of the bottom wall 26 and the rear wall 30 are two pairs of spaced apart supporting plates 34 between which there extend transverse pivot pins 36 for pivotal reception of the extreme distal portions of the boom arms 18. The pivot pins 36 thus constitute the main supports for the bucket as a whole. Additional pivot pins 38 extend between the bracket plates 34 and pivotally receive the adjacent front ends of a pair of tilt control rods 40. The rear ends of the rods 40 are pivotally connected to the upper ends of a pair of levers 42, the lower ends of which are pivoted to the boom arms 18 at the medial regions of the latter. The aforementioned tilt control cylinders 22 are provided with plungers 44 which are pivotally connected at their outer or forward ends to the central or medial regions of the levers 42. The aforementioned cylinders 20 are provided with plungers 46 which are pivotally connected at their outer or upper ends to the medial regions of the boom arms 18.

From the above brief description, it will be apparent that actuation of the hydraulic cylinders 20 will effect swinging movement of the boom arms 18 in respective vertical planes to control the elevation of the bucket 10, while actuation of the hydraulic cylinders 22 will effect swinging movement of the levers 42 to control tilting movement of the bucket. The bucket is capable of tilting movement between an upright or erect position wherein its open rim faces upwards and forwards (see FIG. 5) and an inverted position (not shown) wherein its rim faces downwardly for dumping or unloading purposes.

The arrangement of parts thus far described is purely conventional and no claim is made herein to any novelty associated with the same, the novelty of the present invention residing rather in the construction of a grille-like lid for the bucket 10 and in the mounting means by means of which the lid may be moved into and out of position over the open rim 32 of the bucket. Such lid and the particular mounting means will now be described in detail.

Figure 2:
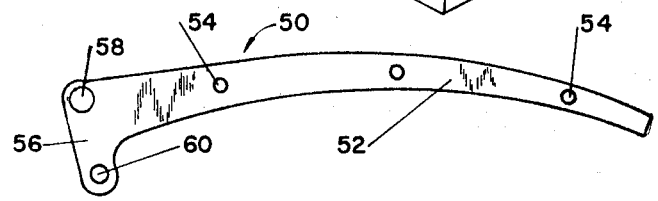
FIG. 2 is a side elevational view of the grille-like bucket lid which is employed in connection with and constitutes the subject matter of the present invention.
Figure 3:
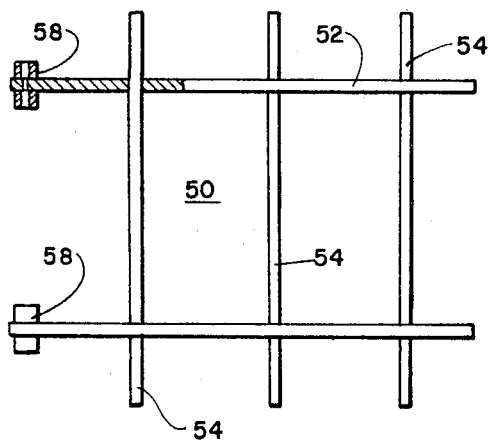
FIG. 3 is a plan view of the bucket lid.

Referring now to all of the views of the drawings, the aforementioned grille-like lid is designated in its entirety by the reference numeral 50 and is shown in its detached condition in FIGS. 2 and 3. This lid involves in its general organization two parallel, spaced apart, bar or plate-like arms 52 which are maintained in their spaced relationship by three horizontally and transversely extending rods 54. The rods 54 project completely through the arms 52 and project outwardly thereof at the opposite sides of the lid 50. As best shown in FIG. 2, each arm 52 is generally of curved and tapered design and the relatively thick proximate end thereof is formed with an enlarged hinge head 56 which, in the generally horizontal illustrated position of the lid, is provided with an upper hinge pin 58 and a lower hinge opening 60. The rods 54 fits snugly within transversely extending holes in the arms 52 and preferably are welded to the arms at the regions of intersection therewith.

Referring now to FIGS. 4 and 5 of the drawings, the lid is hingedly or pivotally connected to the rear wall 30 of the bucket 10 for swinging movement about a horizontal axis between the illustrated full line closed position of FIG. 5 and the dotted line open position of FIG. 5. In its closed position, the grille-like lid overlies the open rim 32 of the bucket receptacle with the end regions of the foremost rod 54 resting on the upper edges of the bucket side walls 24 and with the curved lid arching, so to speak, over the open upper rim of the bucket. This position of the lid 50 is referred to herein as the "closed" position, but it will be understood that the lid, being an open net or grille-like structure, does not fully close the open rim 32 of the bucket but merely overlies the same for material-clamping or retaining purposes, as will be described presently.

The hinge connection between the lid 50 and the rear wall 30 of the bucket is effected by means of a pair of generally U-shaped brackets 62 which may be welded or otherwise secured to said rear wall in spaced relationship near the upper edge thereof as shown in FIG. 4, and by two horizontally extending hinge pins 64 which project transversely across the sides of the brackets 62 and extend through the aforementioned lower hinge openings 60 in the enlarged hinge heads of the arms 52.

In order to swing the lid 50 between its open dotted line position as shown in FIG. 5 and its closed full line position as shown in FIG. 5, a pair of identical hydraulically-operable link assemblies 70 is associated with each of the above-described hinge connections. Each of these link assemblies includes a substantially horizontal dual tension link 72, the front end of which is pivoted to the associated enlarged hinge head 56 by means of the aforementioned hinge pin 58 and the rear end of which is pivoted by a pin 74 to the upper end of a substantially vertical dual thrust link 76. The lower end of the latter link is pivoted by a horizontal pin 78 to the sides of the associated bracket 62. The pin 74 also serves as a pivotal anchor point for the upper end of a substantially vertical plunger 80 which is associated with an upstanding hydraulic cylinder 82, the lower end of which is pivoted by a horizontal pivot pin 84 on a bracket 86 which is suitably secured to the curved bottom wall 26 of the bucket receptacle.

From the above description, it will be apparent that when the two plungers 80 are in their extended condition as shown in FIG. 5, the links 72 will assume an elevated forward position wherein the grille-like lid is caused to overlie the open upper rim 32 of the bucket receptacle with the ends of foremost rod 54 bearing against the upper edges of the bucket side walls, the lid thus being in its closed position. When the two plungers 80 are in their retracted positions, the links 72 will be pulled rearwardly and downwardly under the guiding influence of the thrust links 76, thus shifting the lid 50 bodily as a unit to the completely out-of-the-way open position in which it is shown in dotted lines in FIG. 5 and wherein the open rim 32 of the bucket is unobstructed for scooping operations.

The hydraulic control circuitry which is associated with the conveyor vehicle 12 has not been illustrated herein since it forms no part of the present invention and various forms of control circuitry may be employed if desired. It will be understood, of course, that the operator of the vehicle 12 will have at his disposal suitable control devices by means of which hydraulic fluid may be selectively supplied to the opposite ends of all of the various bucket-control cylinders which are employed in connection with the invention. As shown in FIG. 4, each of the cylinders 82 is provided with flexible fluid lines 90 and 92, the former leading to the lower end of the cylinder and the latter leading to the upper end thereof. These fluid lines may lead to suitable directional valves (not shown) which may be either manually operated or which may be operated under the control of suitable solenoids of an electrical control circuit. Irrespective, however, of the particular control mechanism or circuitry for actuating the various cylinders 20, 22 and 82, the essential features of the present invention are in no way altered.

The herein described conveyor bucket is designed primarily for operation upon loose material such as lumber fragments, brick and other debris such as is encountered at the scene of a wrecking installation. It is also useful for clearing brush and the like. In the operation thereof, the boom arms 18 and the tilt control rods 40 may be actuated under the control of the cylinders 20 and 22 in the usual manner of bucket operation to raise and lower the bucket and to control the angular disposition thereof. In order to place the bucket 10 in a scooping position, the boom arms 18 will be lowered so that the bucket is brought into position at or slightly above ground level, while at the same time the rods 40 will be actuated under the control of the cylinders 22 to cause the bucket 10 to assume a substantially horizontal position wherein its front end wall 28 bears against or slightly overlies the ground and extends in a substantially horizontal plane as shown in FIG. 5. The cylinders 82 will be actuated so that the plungers 80 are retracted, whereupon the lid 50 will extend substantially vertically as shown in dotted lines in FIG. 5 and will be displaced rearwardly so that the open rim 32 of the bucket is unobstructed. In this vertical displaced position of the lid, the tension links 72 and the thrust links 76 will maintain the lid in a fixed or rigid condition with respect to the bucket receptacle so that upon forward movement of the vehicle 12 for scooping purposes, the lid acts as a back stop to catch such material as would ordinarily pass completely over the bucket, especially when the latter has become substantially full. In this manner, the material may be piled high over the rim of the bucket receptacle during loading operations and much material that otherwise might be lost is captured by the existence of the vertical back stop that is afforded by the lid.

After the bucket 10 has thus been fully loaded, the cylinders 82 may be actuated to extend the plungers 80, thus swinging the entire lid 50 forwardly toward its closed position. At the same time, and at the discretion of the operator, the cylinders 22 may be actuated to tilt the bucket toward its upright or vertical position, while the cylinders 20 may be actuated to raise the boom arms 18, and consequently, to elevate the bucket 10. Such material as is contained within the confines of the bucket, and also any material which may remain piled high above the level of the bucket rim 32, will then be captured by the jaw-like gripping action of the lid as it is forcibly swung forwardly and downwardly towards its closed position. If the bucket is not overloaded, the lid 50 may move fully to its closed position, but if the bucket is overloaded so that the material stands high above the level of the open rim of the bucket, the excess material will nevertheless be captured by the clamping action of the lid so that the net effect of the lid is appreciably to increase the carrying capacity of the bucket 10.

As shown in FIG. 1, bucket unloading or dumping operations may be conducted in the usual manner of bucket operation, it being necessary, however, to cause the lid 50 to be moved to its fully open position before the bucket is tilted to its inverted or inclined dumping position.

Having thus described the invention what I claim as new and desire to secure by Letters Patent is:

1. A conveyor bucket having means whereby the same may be tiltably mounted on the distal end of a supporting boom, said bucket comprising a trough-like receptacle having side walls, front and rear end walls, and a bottom wall, said receptacle presenting an upper rectangular rim defining a normally open filling and discharge opening, a generally rectangular grille-like lid hingedly connected to said rear end wall adjacent to the upper edge thereof and capable of swinging movement between a closed position wherein it closely overlies said open rim and extends across the filling and discharge opening, and an open out-of-the-way position wherein it is displaced rearwardly from said opening, said lid including an arcuate grille arm disposed in parallel relation with the side walls of the bucket receptacle, of less longitudinal extent than the longitudinal extent of said filling and discharge opening, and having an enlarged hinge head at its rear end, a series of longitudinally spaced transverse grille rods projecting laterally from the opposite sides of said grille arm and of greater extent than the transverse width of said opening, the ends of the foremost grille rod being adapted to rest upon the upper edges of the receptacle side walls to thus limit the extent of forward swinging movement of the lid and thus establish the closed position thereof, a bracket secured to said rear end wall, an elongated substantially vertical cylinder pivoted to its lower end to said bottom wall and provided with an extensible plunger, a tension link pivoted at one end of the upper portion of said hinge head and at its other end to the upper end of the plunger, the lower end of said hinge head being pivoted to said bracket, and means for supplying hydraulic motive fluid to the opposite ends of said cylinder in order to effect through the medium of said plunger and tension link swinging movement of the lid between its closed and open positions.

2. A conveyor bucket as set forth in claim 1 and wherein said lid is provided with a second and substantially identical grille arm spaced from and parallel to the first grille arm, both grille arms are disposed on opposite sides of the longitudinal centerline of the bucket receptacle, and said grille rods project completely through both grille arms and have their outer ends overhanging the side walls of the receptacle when the lid is in its closed position.

References Cited

UNITED STATES PATENTS 3,057,496 10/1962 Garske _____ 214—767
3,077,999 2/1963 Svoboda _____ 214—145

FOREIGN PATENTS 95,394 1/1960 Norway.

HUGO O. SCHULZ, *Primary Examiner.*

U.S. Cl. X.R.

214—145, 147